United States Patent
Ikegami (10) Patent No.: US 9,567,845 B2
(45) Date of Patent: Feb. 14, 2017

(54) DOWNHOLE SEISMIC SENSOR WITH FILLER FLUID AND METHOD OF USING SAME

(71) Applicant: Schlumberger Technology Corporation, Sugar Land, TX (US)

(72) Inventor: Toru Ikegami, Machida (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 453 days.

(21) Appl. No.: 13/931,996

(22) Filed: Jun. 30, 2013

(65) Prior Publication Data

US 2015/0002159 A1    Jan. 1, 2015

(51) Int. Cl.
| | | |
|---|---|---|
| G01V 3/00 | (2006.01) | |
| E21B 47/01 | (2012.01) | |
| G01V 3/26 | (2006.01) | |
| G01V 1/18 | (2006.01) | |
| G01V 1/52 | (2006.01) | |
| G01V 1/40 | (2006.01) | |

(52) U.S. Cl.
CPC ............... *E21B 47/01* (2013.01); *G01V 1/182* (2013.01); *G01V 1/523* (2013.01); *G01V 3/26* (2013.01); *G01V 1/184* (2013.01); *G01V 1/40* (2013.01); *G01V 2200/16* (2013.01); *G01V 2210/1429* (2013.01)

(58) Field of Classification Search
CPC .............. G01V 3/30; G01V 3/18; G01V 3/32; G01V 3/10; G01V 3/20; G01R 33/44
USPC ................. 324/324–375; 73/152.46; 250/254
See application file for complete search history.

(56) References Cited

U.S. PATENT DOCUMENTS

| | | | |
|---|---|---|---|
| 2,348,225 | A | 5/1944 | Petty |
| 3,878,504 | A | 4/1975 | Sears |
| 3,953,829 | A | 4/1976 | Boyle |
| 4,266,287 | A | 5/1981 | Elswood et al. |
| 4,618,949 | A | 10/1986 | Lister |
| 4,893,290 | A * | 1/1990 | McNeel ............... G01V 1/16 181/102 |
| 5,469,408 | A * | 11/1995 | Woo ................. G01V 1/181 367/182 |
| 5,557,201 | A * | 9/1996 | Kleinberg ........... G01N 24/081 324/303 |
| 6,094,991 | A | 8/2000 | Stewart et al. |
| 6,474,439 | B1 * | 11/2002 | Hoyle .................. G01V 1/52 181/102 |

(Continued)

OTHER PUBLICATIONS

Extended search report for the equivalent European patent application No. 14174659.4 issued on Nov. 5, 2015.

*Primary Examiner* — Son Le
*Assistant Examiner* — Thang Le
(74) *Attorney, Agent, or Firm* — Trevor G. Grove (57) ABSTRACT

A seismic sensor for a downhole tool positionable in a wellbore penetrating a subterranean formation. The seismic sensor includes a sensor housing, a bobbin supported in the sensor housing along an axis thereof, at least one coil wound about the bobbin (the coil movably supportable within the sensor housing by at least one spring), at least one magnet positionable about the bobbin to generate a magnetic field with the at least one coil whereby seismic vibrations are detectable, and a filler fluid disposed in the sensor housing to buoy the at least one coil whereby gravitational effects may be neutralized.

20 Claims, 8 Drawing Sheets

(56) References Cited

U.S. PATENT DOCUMENTS

| | | | |
|---|---|---|---|
| 6,922,374 B2 * | 7/2005 | Hagedoorn | G01V 1/181 |
| | | | 367/178 |
| 7,048,089 B2 | 5/2006 | West et al. | |
| 7,132,597 B2 | 11/2006 | Hosler | |
| 7,623,414 B2 | 11/2009 | Boergen et al. | |
| 7,667,128 B2 | 2/2010 | Hosler | |
| 7,733,740 B2 | 6/2010 | Hillesund et al. | |
| 7,926,614 B2 | 4/2011 | Tenghamn et al. | |
| 8,061,047 B2 | 11/2011 | Igarashi et al. | |
| 8,358,560 B2 | 1/2013 | Muyzert et al. | |
| 8,913,464 B2 * | 12/2014 | Kamata | G01V 1/182 |
| | | | 367/182 |
| 2004/0207539 A1 * | 10/2004 | Schultz | G01V 3/18 |
| | | | 340/854.3 |
| 2009/0238043 A1 | 9/2009 | Kamata et al. | |
| 2010/0020636 A1 | 1/2010 | Kamata et al. | |
| 2010/0296366 A1 | 11/2010 | Kamata | |
| 2011/0194375 A1 | 8/2011 | Kamata et al. | |
| 2012/0063263 A1 | 3/2012 | Kamata | |
| 2012/0176859 A1 | 7/2012 | Pabon et al. | |
| 2012/0294116 A1 | 11/2012 | Kamata | |

\* cited by examiner

DOWNHOLE SEISMIC SENSOR WITH FILLER FLUID AND METHOD OF USING SAME

BACKGROUND

The present disclosure relates generally to wellsite operations. In particular, the present disclosure relates to formation evaluation involving measuring downhole parameters, such as seismic parameters of a subterranean formation.

Wellbores are drilled to locate and produce hydrocarbons. A downhole drilling tool with a bit at an end thereof is advanced into the ground to form a wellbore. As the drilling tool is advanced, drilling mud is pumped through the drilling tool and out the drill bit to cool the drilling tool and carry away cuttings. The fluid exits the drill bit and flows back up to the surface for recirculation through the drilling tool. The drilling mud is also used to form a mudcake to line the wellbore.

During or after a drilling operation, various downhole evaluations may be performed to determine characteristics of the wellbore and surrounding formation. In some cases, the drilling tool may be provided with devices to test the surrounding formation and/or fluid contained in reservoirs therein. In some cases, the drilling tool may be removed and a downhole wireline tool may be deployed into the wellbore to test the formation. These tests may be used, for example, to determine whether valuable hydrocarbons are present. Production equipment may be positioned in the wellbore to draw located hydrocarbons to the surface.

Formation evaluation may involve positioning sensors in the wellbore to take downhole measurements. Downhole tools may be provided with sensors for measuring downhole parameters. Examples of sensors are provided in US Publication Nos. 2012/0063263, 2011/0194375, 2010/0296366, 2009/0238043, and 2010/0020636, the entire contents of which are hereby incorporated by reference.

SUMMARY

In one aspect, the disclosure relates to a seismic sensor for a downhole tool positionable in a wellbore penetrating a subterranean formation. The seismic sensor includes a sensor housing, a bobbin movably supported in the sensor housing by a spring, at least one tubular magnet fixedly positionable in the sensor housing to generate a magnetic field therein, at least one coil wound about the bobbin and movable therewith relative to the tubular magnet whereby seismic vibrations are detectable, and a filler fluid disposed in the sensor housing to buoy the coil whereby displacement of the coil may be reduced.

In another aspect, the disclosure relates to a downhole tool positionable in a wellbore penetrating a subterranean formation. The downhole tool includes a tool housing and a sensor package positionable in the tool housing. The sensor package includes at least one seismic sensor. The seismic sensor includes a sensor housing, a bobbin movably supported in the sensor housing by a spring, at least one tubular magnet fixedly positionable in the sensor housing to generate a magnetic field therein, at least one coil wound about the bobbin and movable therewith relative to the tubular magnet whereby seismic vibrations are detectable, and a filler fluid disposed in the sensor housing to buoy the coil whereby displacement of the coil may be reduced.

In still another aspect, the disclosure relates to a method of sensing downhole parameters about a wellbore penetrating a subterranean formation. The method involves deploying a downhole tool into the wellbore. The downhole tool includes a tool housing and a sensor package positionable in the tool housing. The sensor package includes at least one seismic sensor. The seismic sensor includes a sensor housing, a bobbin movably supported in the sensor housing by a spring, at least one tubular magnet fixedly positionable in the sensor housing to generate a magnetic field therein, at least one coil wound about the bobbin and movable therewith relative to the tubular magnet whereby seismic vibrations are detectable, and a filler fluid disposed in the sensor housing to buoy the coil whereby displacement of the coil may be reduced. The method may also involve measuring downhole parameters of the formation with the seismic sensor.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of seismic sensors with filler fluid and methods of using same are described with reference to the following figures. The same numbers are used throughout the figures to reference like features and components.

FIGS. 1.1-1.3 depict schematic views, partially in cross-section, of a wellsite with a downhole tool deployed into a wellbore for performing downhole formation evaluation in accordance with embodiments of the present disclosure;

FIGS. 2.1 and 2.2 depict schematic views of a portion of the downhole drilling tool and the downhole wireline tool of FIGS. 1.1 and 1.2, respectively, having seismic sensors therein in accordance with embodiments of the present disclosure;

FIGS. 3.1 and 3.2 are schematic, cross-sectional views of a seismic sensor having a fluid therein with a magnet and a coil center, respectively, in accordance with embodiments of the present disclosure.

DETAILED DESCRIPTION

The description that follows includes exemplary systems, apparatuses, methods, techniques, and instruction sequences that embody techniques of the inventive subject matter. However, it is understood that the described embodiments may be practiced without these specific details.

The present disclosure relates to a seismic sensor positionable about a downhole tool for measuring seismic parameters of a subsurface formation. The seismic sensor includes a housing with a bobbin, a coil and a magnet supported therein. The bobbin may be positioned with the coil about the magnet or with the magnet about the coil. The coil is movably supported within the housing by a spring. A filler fluid is provided in the housing to buoy the coil such that the effects of gravity on the coil are reduced and/or the natural frequencies of the seismic sensor are limited.

'Formation evaluation' as used herein relates to the measurement, testing, sampling, and/or other analysis of wellsite materials, such as gases, fluids, and/or solids. Such formation evaluation may be performed at surface and/or downhole location to provide data, such as downhole parameters (e.g., temperature, pressure, permeability, porosity, seismic, etc.), material properties (e.g., viscosity, composition, density, etc.), and the like.

'Seismic monitoring' as used herein relates to a type of formation evaluation involving investigation of subsurface formations. Seismic monitoring may be performed by a seismic sensor capable of measuring formation properties, such as ground motion and/or earth vibrations. Seismic sensors, such as geophones, hydrophones, seismometers, seismographs, electronic sensors, amplifiers, recorders, and/or other seismic measurement and/or sensing devices, may be used to measure seismic parameters during seismic monitoring.

Figure 11:
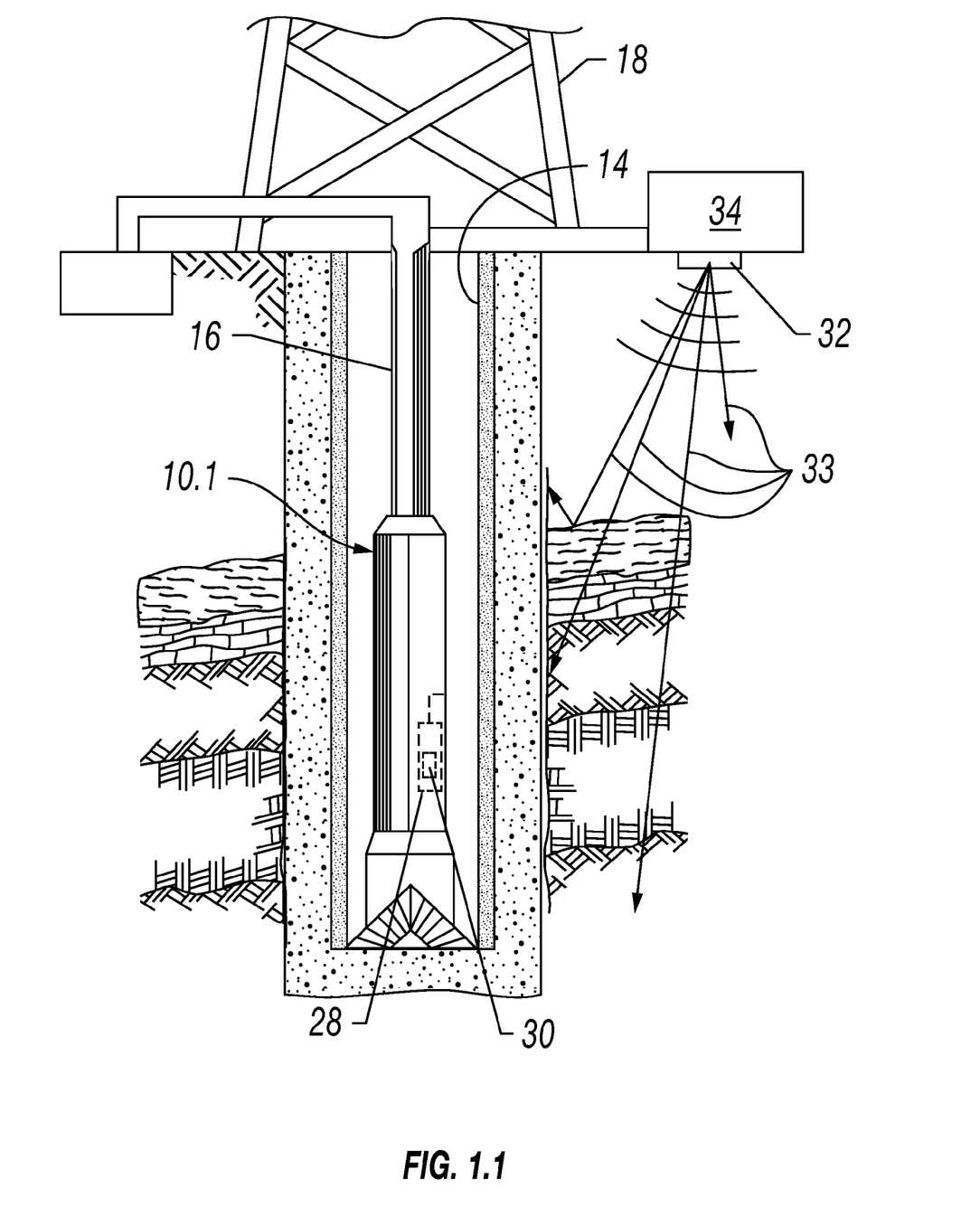
Figure 12:
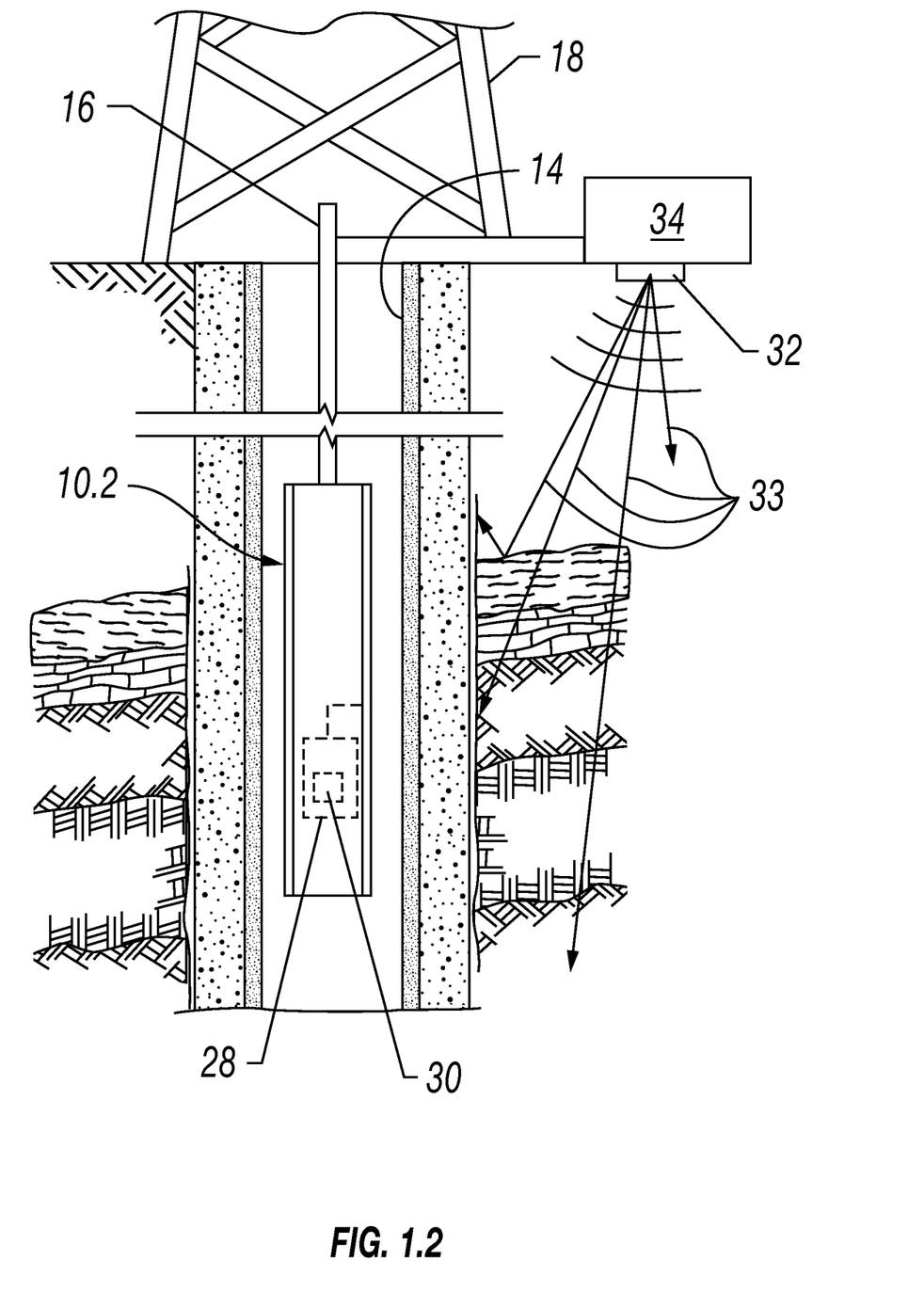
Figure 13:
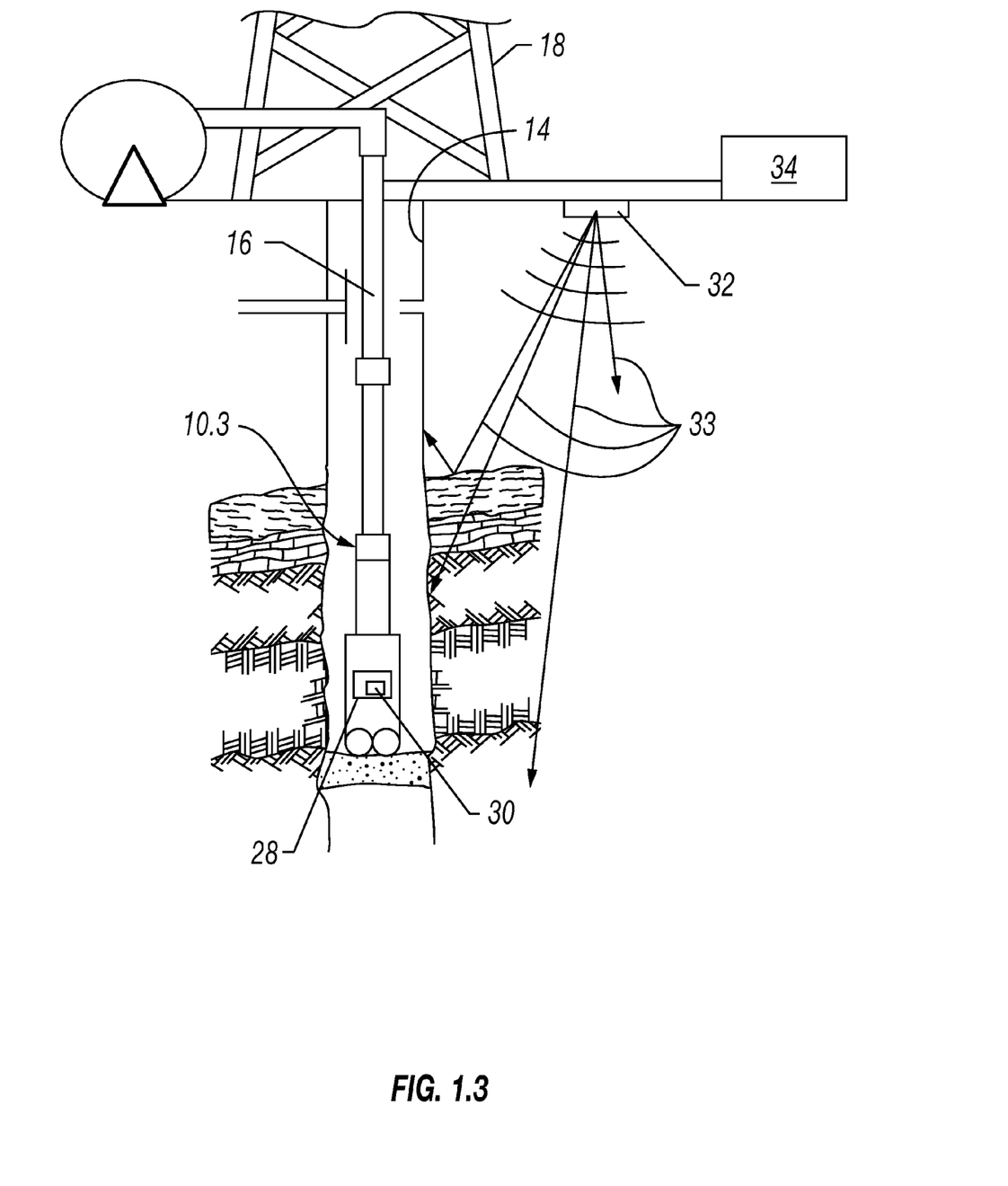

FIGS. 1.1-1.3 depict environments in which subject matter of the present disclosure may be implemented. FIG. 1.1 depicts a downhole drilling tool 10.1, FIG. 1.2 depicts a downhole wireline tool 10.2, and FIG. 1.3 depicts a downhole treatment tool 10.3, all tools may be used for performing formation evaluation and/or seismic monitoring. In the examples shown, the various downhole tools may be used to measure various downhole parameters, such as seismic parameters of a subterranean formation.

The downhole drilling tool 10.1 may be advanced into the subterranean formation to form a wellbore 14. The downhole drilling tool 10.1 may be conveyed alone or among one or more (or itself may be) measurement-while-drilling (MWD) drilling tools, logging-while-drilling (LWD) drilling tools, or other drilling tools. The downhole drilling tool 10.1 is attached to a conveyance (e.g., drillstring) 16 driven by a rig 18 to form the wellbore 14.

The downhole drilling tool 10.1 may be withdrawn from the wellbore 14, and the downhole wireline tool 10.2 of FIG. 1.2 may be deployed from the rig 18 into the wellbore 14 via conveyance (e.g., a wireline cable) 16 to perform downhole testing and/or sampling. A downhole treatment tool 10.3 may also be deployed from the rig 18 into the wellbore 14 via conveyance (e.g., coiled tubing) 16 to perform downhole treatment, such as injection, fracturing and/or other operations. A reel may be used to deploy the downhole treatment tool 10.3 into the wellbore 14 via the coiled tubing 16.

The downhole tools 10.1-10.3 may also be provided with a formation evaluation tool 28 with a sensor package 30 for measuring downhole parameters about the wellbore 14. The sensor package 30 includes one or more seismic sensors (and other sensors) for measuring downhole parameters, such as seismic and other parameters.

A seismic source 32 may be provided to generate seismic waves 33 through the formation for detection by the sensor package 30. As shown, the seismic source 32 is at a surface location, but may be anywhere capable of generating seismic waves 33 for measurement by the sensor package 30. Measurements captured by the sensor package 30 may be collected for retrieval at the surface. A surface unit 34 may be provided to communicate with the downhole tools 10.1-10.3 for passage of signals (e.g., data, power, command, etc.) therebetween.

While FIGS. 1.1-1.3 depict specific types of downhole tools 10.1-10.3, any downhole tool capable of performing formation evaluation may be used, such as drilling, coiled tubing, wireline or other downhole tool. Also, while FIGS. 1.1-1.3 depict one sensor package 30 in a downhole tool, it will be appreciated that one or more sensor packages 30 and/or other sensors may be positioned at various locations about the downhole tool and/or the wellbore.

Figure 21:
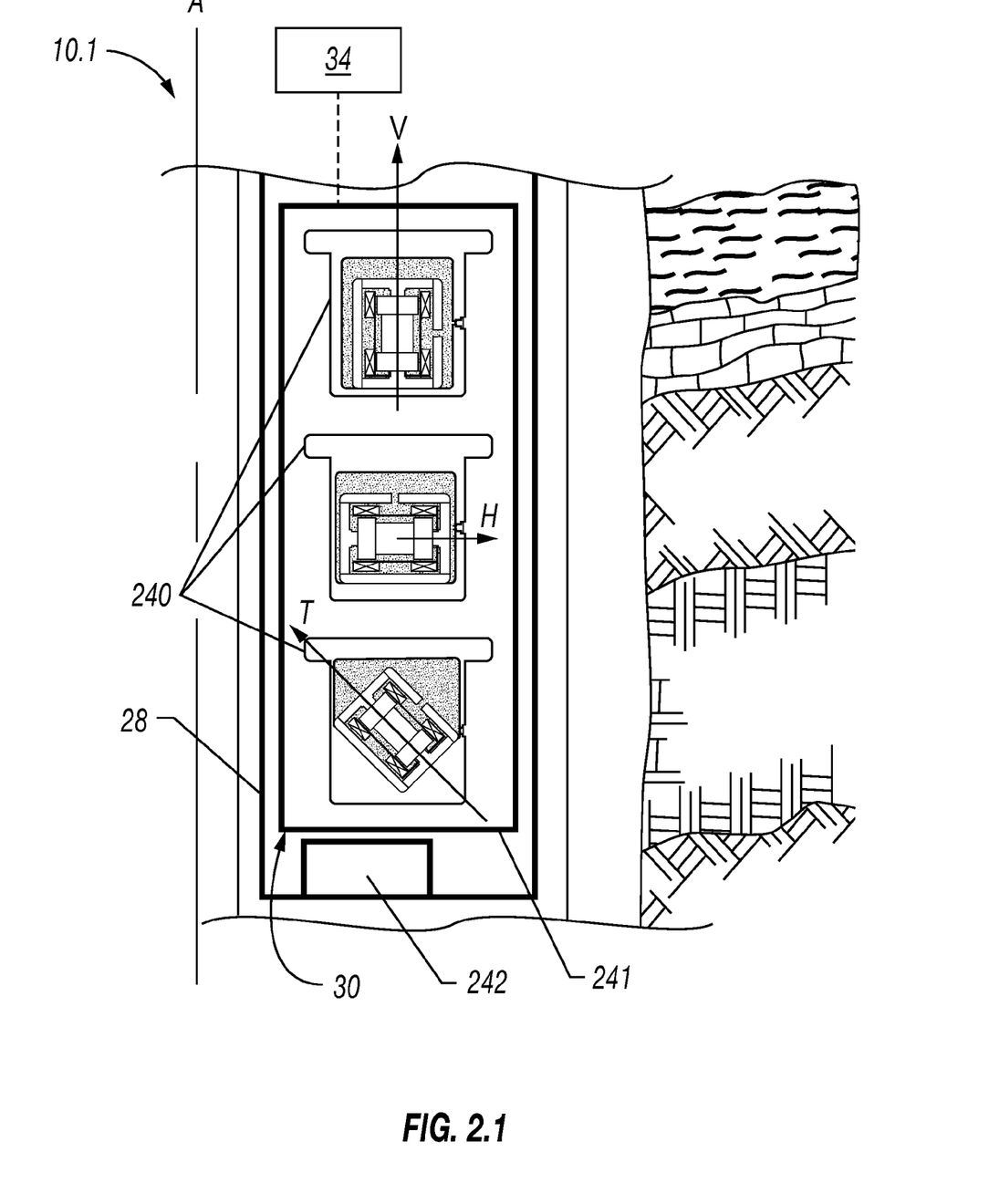
Figure 22:
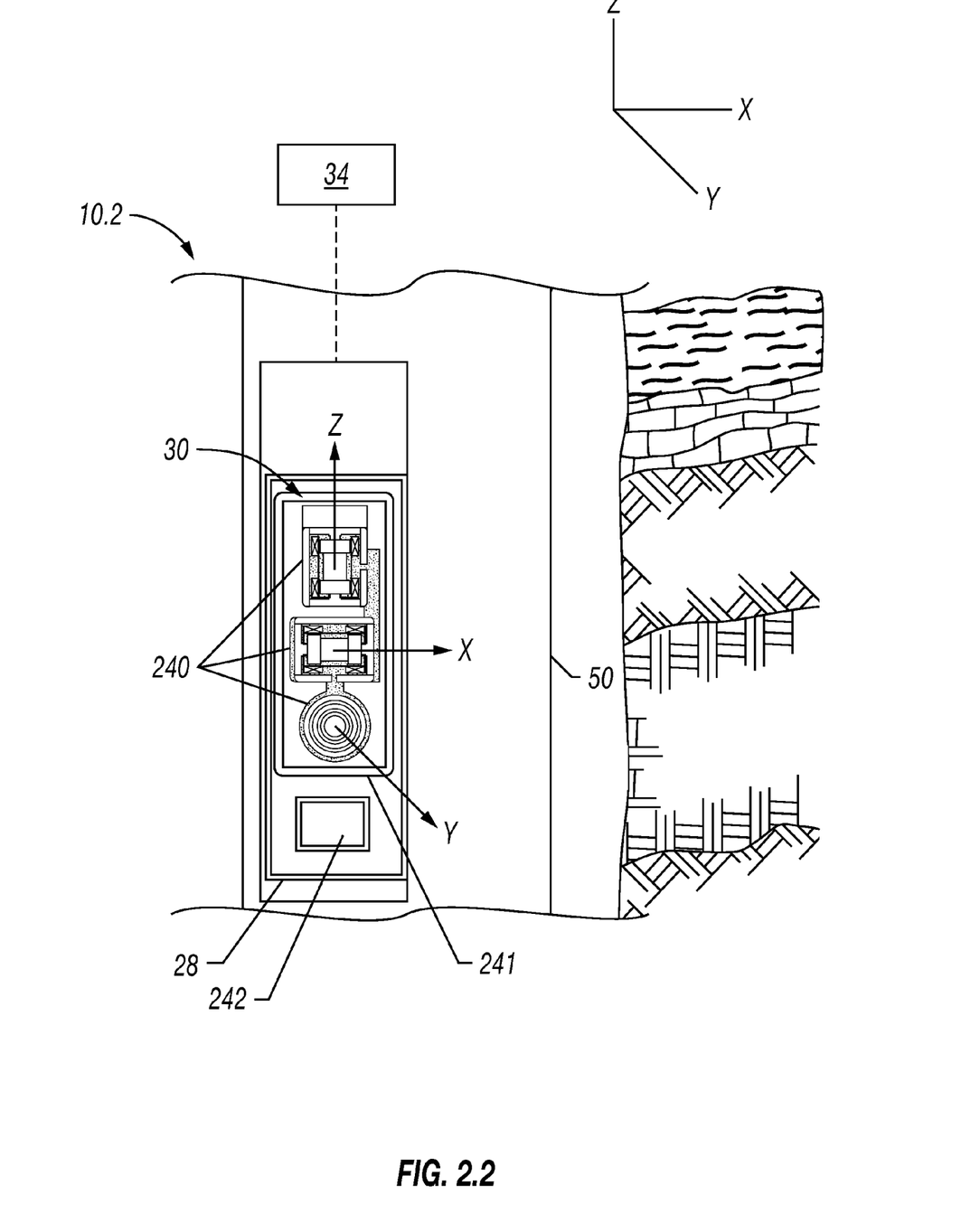

FIGS. 2.1 and 2.2 are schematic views of a portion of the downhole tools 10.1 and 10.2, respectively, depicting the formation evaluation tool 28 with the sensor package 30 therein. The sensor package 30 includes a package housing 241 containing three seismic sensors 240. As demonstrated by these figures, the sensor package 30 may include one or more seismic sensors 240 in various orientations about the downhole tool. The sensor package 30 may be, for example, a three component geophone with three seismic sensors 240 therein.

In the sensor package 30 of FIG. 2.1, three seismic sensors 240 are positioned in a module of the downhole drilling tool 10.1 for measurement in different orientations. The three seismic sensors 240 are depicted as being linearly aligned in a wall of the downhole drilling tool 10.1, but may optionally be dispersed about the downhole drilling tool 10.1. The sensor package 30 may be positioned, for example, in a drill collar of the downhole drilling tool 10.1 with drilling mud passing therethrough.

As also indicated by FIG. 2.1, the seismic sensors 240 are oriented relative to an axis A of the downhole drilling tool 10.1. The seismic sensors 240 in this figure are oriented vertically as indicated by axis V, horizontally as indicated by axis H, and tilted as indicated by axis T. These multiple orientations about various axes permit comparison of measurements by the various seismic sensors 240. For example, effects of variations caused by directional forces, such as gravitational forces, may be detectable by differences in measurements taken by the seismic sensors 240.

In the sensor package 30 of FIG. 2.2, three seismic sensors 240 are positioned in a module 50 of the downhole wireline tool 10.2 for measurement along orthogonal axes of a three-dimensional rectangular coordinate system. Each of the seismic sensors 240 is oriented along an axis X, Y, and Z, respectively. As also indicated by FIG. 2.2, the three seismic sensors 240 are depicted as being linearly aligned along the downhole wireline tool 10.2, but may optionally be dispersed about the downhole wireline tool 10.2.

The downhole tools 10.1 and 10.2 of FIGS. 2.1 and 2.2 may also be provided with one or more additional sensors 242 for measuring various downhole parameters, such as temperature, pressure, and/or other downhole parameters. The sensor(s) may include, for example, gauges (e.g., quartz), densitometers, viscometers, resistivity sensors, nuclear sensors, and/or other measurement and/or detection devices capable of taking downhole data relating to, for example, downhole conditions and/or fluid properties. Data and test results obtained from various locations and/or using various methods and/or apparatuses may be analyzed and compared.

As schematically depicted, a surface and/or downhole unit 34 may be provided to communicate with the formation evaluation tool 28, the sensor package 30, the seismic sensors 240 and/or other portions of the downhole tools for the passage of signals (e.g., data, power, command, etc.) therebetween. The unit 34 may include, for example, a measurement-while-drilling tool, a logging-while-drilling tool, a processor, a controller, a transceiver, a power source and other features for operating and/or communicating with the formation evaluation tool 28, the sensor package 30 and/or the seismic sensors 240.

FIGS. 3.1 and 3.2 are detailed views of downhole seismic sensors 340.1, 340.2 usable as the seismic sensors 240 for FIGS. 2.1 and 2.2. FIG. 3.1 shows the seismic sensor 340.1 having a magnet center. FIG. 3.2 shows the seismic sensor 340.2 having a coil center. Each seismic sensor 340.1, 340.2 has a sensor housing 342 with a filler fluid 344 therein.

Figure 31:
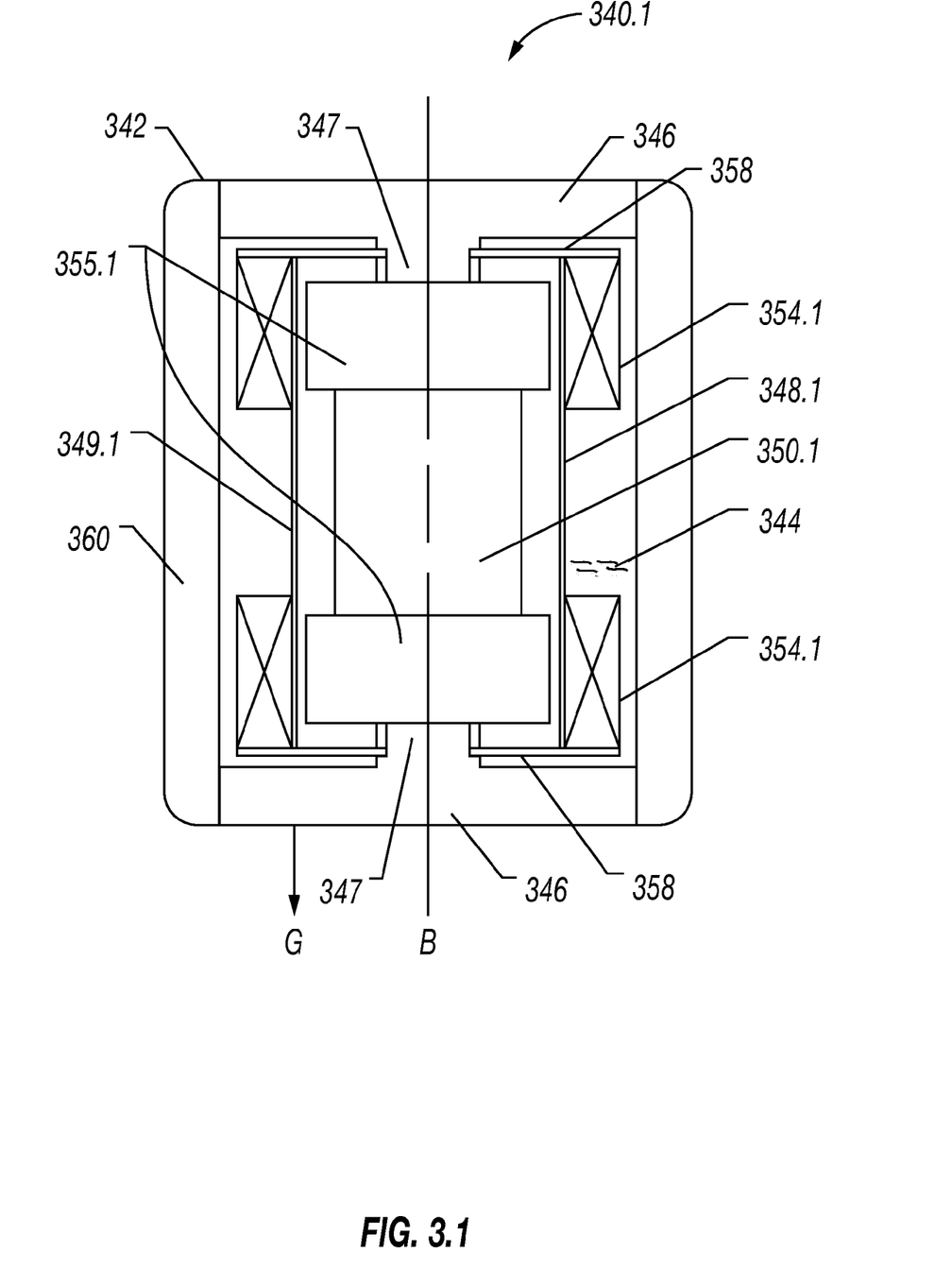

In the version of FIG. 3.1, the seismic sensor 340.1 includes the sensor housing 342, a bobbin 348.1, moving coils 354.1, magnets 355.1, and springs 358. The sensor housing 342 has opposite ends 346 with a tubular sidewall 360. The bobbin 348.1 is pressed between the opposite ends 346 of the sensor housing 342 and supported therebetween. The ends 346 may be provided with a support 347 extending therefrom for engagement with the bobbin 348.1.

The bobbin 348.1 has a bobbin housing 349.1 with a shaft 350.1 therein. Magnets 355.1 are positioned at opposite ends of the shaft 350.1 adjacent the ends 346 of the sensor housing 342. The magnets 355.1 are positioned inside the bobbin 348.1. The springs 358 may be one or more circular springs, with an inner portion connected to the sensor housing 342 and an outer portion connected to the bobbin 348.1 to allow the bobbin 348.1 to move within the sensor housing 342. In an example, the springs 358 may be used to support the bobbin 348.1 to translate in a direction parallel to axis B of the seismic sensor 340.1, and/or to resist movement in a radial direction.

The magnets 355.1 may be positioned in the bobbin housing 349.1, and the magnets 355.1 define north and south poles about the bobbin 348.1 to generate a magnetic field. The magnets 355.1 may be, for example, permanent magnets, electromagnets, and/or other types of magnets. The magnets 355.1 may be formed from a number of discrete pieces or a single piece magnet may be used.

As shown, two coils 354.1 are disposed about each end of the bobbin housing 349.1. One or more coils 354.1 may be provided, and wound about the bobbin housing 349.1. The coils 354.1 may be positioned to move with the bobbin 348.1 relative to the magnets 355.1. The springs 358 may be circular, disc, spider, or other spring configurations capable of supporting the coils 354.1 for taking seismic measurements.

The filler fluid 344 may be any fluid, gas or other material capable of providing buoyancy to support the coils 354.1 in the sensor housing 342. The filler fluid 344 may be inserted into the sensor housing 342 to provide buoyancy to the coils 354.1. This buoyancy may be used to neutralize the effects of the gravitational force G by reducing or eliminating the low frequency limit of the natural frequency of the seismic sensor 340.1. The buoyancy may be used to reduce the natural displacement of the moving coils 354.1 while allowing movement of the moving coils 354.1 to measure vibration.

In operation, the seismic sensor 340.1 utilizes buoyancy provided by the filler fluid 344 to control the frequency response provided by the seismic sensor 340.1. The coils 354.1 move along a natural displacement. The natural displacement of the coils 354.1 may be affected by their orientation relative to gravity. For example, as shown in FIG. 3.1, when the axis B of the coils 354.1 is parallel to gravitational force as indicated by arrow G, the natural displacement (x) of the seismic sensor 340.1 may be determined by the effective stiffness (k) of the springs 358, the mass (m) of the moving coils 354.1, and gravity (g) as follows:

$$x = \frac{mg}{k} \quad \text{Equation (1)}$$

On the other hand, the natural frequency ($f_0$) of the seismic sensor 340.1 can be determined by the effective stiffness (k) of the springs 358 and the mass (m) of the moving coils 354.1 as follows:

$$f_0 = \frac{1}{2\pi}\sqrt{\frac{k}{m}} \quad \text{Equation (2)}$$

To lower natural frequency ($f_0$), smaller spring stiffness (k) and/or larger mass (m) may be provided. Combining Equations (1) and (2) provides the following:

$$f_0 = \frac{1}{2\pi}\sqrt{\frac{g}{x}} \quad \text{Equation (3)}$$

Equation (3) indicates that a larger natural displacement (x) may be needed to provide a lower natural frequency ($f_0$).

Larger natural displacement may introduce variation in seismic sensor response when the seismic sensor is placed in different orientation with respect to the gravity. For example, the seismic sensor 340.1 may be positioned with its axis B in a position non-parallel to the gravitational force G. Such non-parallel position may be for example, the horizontal H or tilted T positions of FIG. 2.1 or the X or Y positions of FIG. 2.2.

By providing the filler fluid 344 into the sensor housing 342 of the seismic sensor 340.1, the buoyancy may be used to reduce the effects of gravity. Assuming the density ($\rho_r$) of the filler fluid 344 and the density ($\rho_c$) of the moving coils 354.1, Equation (1) can be rewritten as follows:

$$x = \left|1 - \frac{\rho_f}{\rho_c}\right|\frac{mg}{k} \quad \text{Equation (4)}$$

Therefore, for a given natural displacement (x), the natural frequency ($f_0$) can be reduced to:

$$f_0 = \frac{1}{2\pi}\sqrt{\left|1 - \frac{\rho_f}{\rho_c}\right|\frac{g}{x}} \quad \text{Equation (5)}$$

The density ratio $$\frac{\rho_f}{\rho_c}$$

may be chosen to provide the desired result. For example, the density ($\rho_r$) of the filler fluid 344 and the density ($\rho_c$) of the moving coils 354.1 may be selected to be the same ($\rho_r = \rho_c$). In this example, the seismic sensor 340.1 may remain sensitive, and the natural frequency may be optimized.

Based on the equations, the natural frequency of the seismic sensor 340.1 may be lowered by reducing stiffness of the springs 358 and/or by increasing the mass of the coils 354.1. Reduced stiffness of the springs 358 and/or increased mass of the coils 354.1 may result in a large natural displacement. This larger natural displacement may introduce variation in response provided by the seismic sensor 340.1 when it is placed in a different orientation with respect to the gravity.

Figure 32:
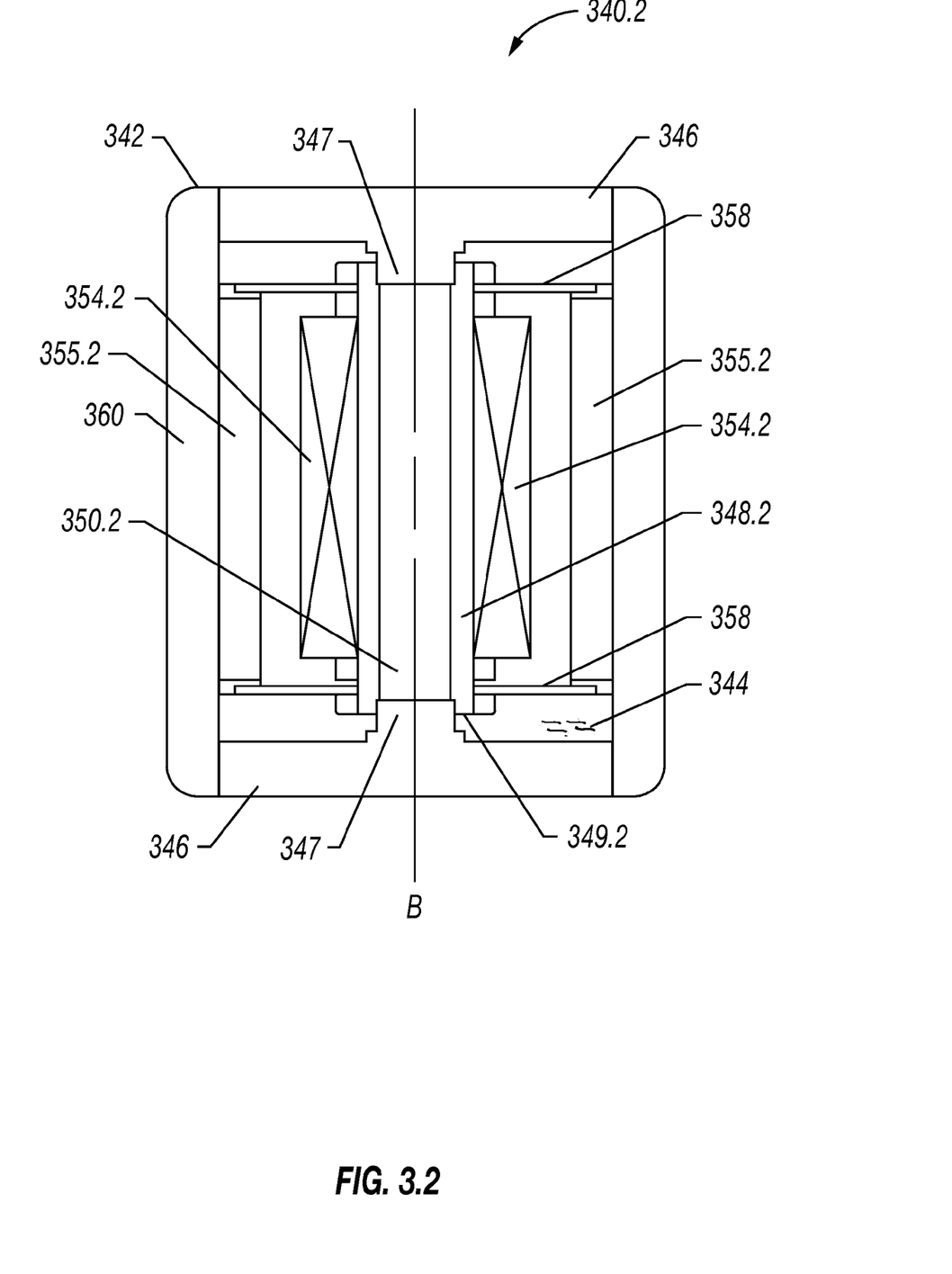

FIG. 3.2 shows another version of the seismic sensor 340.2 including the sensor housing 342, a bobbin 348.2, moving coil 354.2, magnets 355.2, and springs 358. The sensor housing 342 has opposite ends 346 with cylindrical sidewall 360. The bobbin 348.2 is pressed between the opposite ends 346 of the sensor housing 342 and supported therebetween. The ends 346 may be provided with supports 347 extending therefrom for engagement with the bobbin 348.2.

The bobbin 348.2 has a bobbin housing 349.2 with a shaft 350.2 therein. Coil 354.2 is positioned at opposite ends of the shaft 350.2 between the ends 346 of the sensor housing 342. The bobbin 348.2 is positioned inside the coil 354.2. Magnets 355.2 are secured in the sensor housing 342 along sidewall 360.

The springs 358 are positioned between the sensor housing 342 and the bobbin 348.2 to movably support the bobbin 348.2 in the sensor housing 342. The coil 354.2 is supported about the bobbin 348.2 and moves therewith. The magnets 355.2 may be fixedly supported in the sensor housing 342. The magnets 355.2 may be, for example, permanent magnets, electromagnets, and/or other types of magnets. The magnets 355.2 may be formed from a number of discrete pieces or a single piece magnet may be used.

As shown, one coil 354.2 is disposed about the bobbin housing 349.2. One or more coils may be provided, and wound about the bobbin housing. The coil 354.2 may be positioned to move with the bobbin 348.2 relative to the magnets 355.2. In an example, the springs 358 may be used to support the bobbin 348.2 to translate in a direction parallel to axis B of the seismic sensor 340.2, and/or to resist movement in a radial direction.

The seismic sensor 340.2 of FIG. 3.2 uses a filler fluid 344 to provide buoyancy to coil 354.2 in a similar manner as described with respect to the seismic sensor 340.1 of FIG. 3.1.

While the figures herein depict specific configurations of seismic sensor package 30 and/or seismic sensors 240, 340.1, 340.2, various features of certain seismic sensors may be provided on other sensors. For example, certain configurations of magnets, coils, bobbins, and springs may be provided. In another example, one or more of the various seismic sensors may be provided about one or more of the downhole tools 10.1-10.3 to take the desired measurements in the desired orientation. One or more additional sensors capable of measuring other downhole parameters may also be provided in the sensor package 30. In yet another example, one or more seismic sensors may also be provided that do not have filler fluid 344. In some cases, the use of non-filled seismic sensors may accept a larger displacement as a cost of having lower natural frequency, or they may compromise natural frequency for smaller maximum displacement (also known as maximum excursion).

Figure 4:
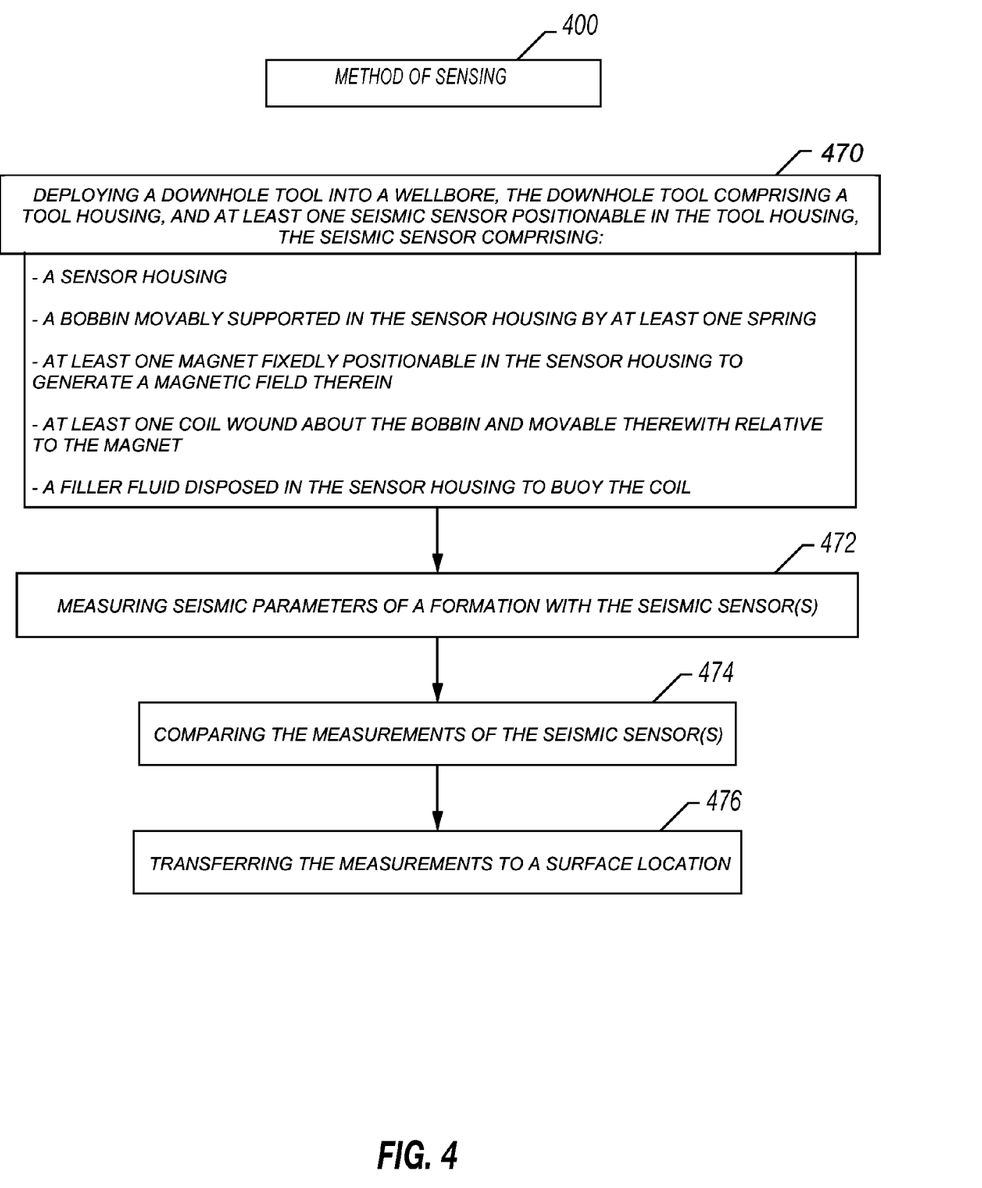
FIG. 4 is a flow chart illustrating a method of sensing downhole parameters in accordance with embodiments of the present disclosure.

FIG. 4 shows an example method 400 of sensing downhole parameters. The method involves 470—deploying a downhole tool into a wellbore. The downhole tool includes a tool housing and a seismic sensor positionable in the tool housing. The seismic sensor includes a sensor housing, a bobbin supported in the sensor housing along an axis thereof, at least one coil wound about the bobbin (the coil movably supportable within the sensor housing by at least one spring), at least one magnet positionable about the bobbin to generate a magnetic field with the coil whereby ground or earth vibrations are detectable, and a filler fluid disposed in the sensor housing to buoy the coil whereby gravitational effects may be neutralized.

The method may also involve 472—measuring seismic parameters of a formation with one or more seismic sensors, 474—comparing the measurements of the seismic sensors, and/or 476—transferring the measurements to a surface location. The method may be performed in any order and repeated as desired.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A seismic sensor for a downhole tool positionable in a wellbore penetrating a subterranean formation, the seismic sensor comprising:
   a sensor housing;
   a bobbin movably supported in the sensor housing by at least one spring;
   at least one magnet fixedly positionable in the sensor housing to generate a magnetic field therein;
   at least one coil wound about the bobbin and movable therewith relative to the at least one magnet whereby seismic vibrations are detectable; and
   a filler fluid disposed in the sensor housing to buoy the at least one coil to reduce an effect of gravity on the at least one coil, whereby displacement of the at least one coil due to the effect of gravity is reduced while still allowing sufficient movement of the at least one coil to measure vibration.

2. The seismic sensor of claim 1, wherein the at least one coil is positioned within the at least one magnet.

3. The seismic sensor of claim 1, wherein the at least one coil is positioned outside the at least one magnet.

4. The seismic sensor of claim 1, wherein the bobbin comprises a bobbin housing with a bobbin shaft therein.

5. The seismic sensor of claim 4, wherein the at least one magnet comprises a pair of tubular magnets positioned in the bobbin housing with the bobbin shaft therethrough.

6. The seismic sensor of claim 1, wherein the at least one magnet comprises a tubular magnet positioned along an inner surface of the sensor housing.

7. The seismic sensor of claim 1, wherein the at least one coil comprises a pair of coils or a single coil wound about a bobbin housing of the bobbin.

8. The seismic sensor of claim 1, wherein the at least one spring is positionable between the sensor housing and a bobbin housing of the bobbin.

9. The seismic sensor of claim 1, wherein a density of the filler fluid and a density of the at least one coil are the same.

10. The seismic sensor of claim 1, wherein the sensor housing has an axis therethrough, the bobbin movably positionable in a direction parallel to the axis.

11. A downhole tool positionable in a wellbore penetrating a subterranean formation, the downhole tool comprising:
a tool housing; and
a sensor package positionable in the tool housing, the sensor package comprising at least one seismic sensor, the at least one seismic sensor comprising:
a sensor housing;
a bobbin movably supported in the sensor housing by at least one spring;
at least one magnet fixedly positionable in the sensor housing to generate a magnetic field therein;
at least one coil wound about the bobbin and movable therewith relative to the at least one magnet whereby seismic vibrations are detectable; and
a filler fluid disposed in the sensor housing to provide buoyancy to the at least one coil to reduce an effect of gravity such that the natural displacement of the at least one coil due to the effect of gravity is reduced while allowing sufficient movement of the at least one coil to measure vibration.

12. The downhole tool of claim 11, further comprising one of a downhole unit, a surface unit and combinations thereof.

13. The downhole tool of claim 11, wherein the sensor package comprises a plurality of seismic sensors.

14. The downhole tool of claim 13, wherein the plurality of seismic sensors include three seismic sensors having: (1) an X-axis orientation, a Y-axis orientation and a Z-axis orientation, respectively, or (2) a vertical orientation, a horizontal orientation and a tilted orientation, respectively.

15. The downhole tool of claim 11, further comprising at least one downhole sensor.

16. A method of sensing downhole parameters about a wellbore penetrating a subterranean formation, the method comprising:
deploying a downhole tool into the wellbore, the downhole tool comprising a tool housing and a sensor package positionable in the tool housing, the sensor package comprising at least one seismic sensor, the at least one seismic sensor comprising:
a sensor housing;
a bobbin movably supported in the sensor housing by at least one spring;
at least one magnet fixedly positionable in the sensor housing to generate a magnetic field therein;
at least one coil wound about the bobbin and movable therewith relative to the at least one magnet whereby seismic vibrations are detectable; and
a filler fluid disposed in the sensor housing to buoy the at least one coil;
utilizing the filler fluid to neutralize effects of gravitational force by lowering the low frequency limit of the natural frequency of the seismic sensor while allowing movement of the at least one coil to measure vibration; and
measuring downhole parameters of the formation with the at least one seismic sensor.

17. The method of claim 16, wherein the downhole parameters comprise seismic parameters.

18. The method of claim 16, further comprising transferring the measured downhole parameters to a surface location.

19. The method of claim 16, wherein the measuring comprises measuring downhole parameters of the formation with a plurality of seismic sensors.

20. The method of claim 19, further comprising comparing measured downhole parameters of the plurality of seismic sensors.

* * * * *